UNITED STATES PATENT OFFICE.

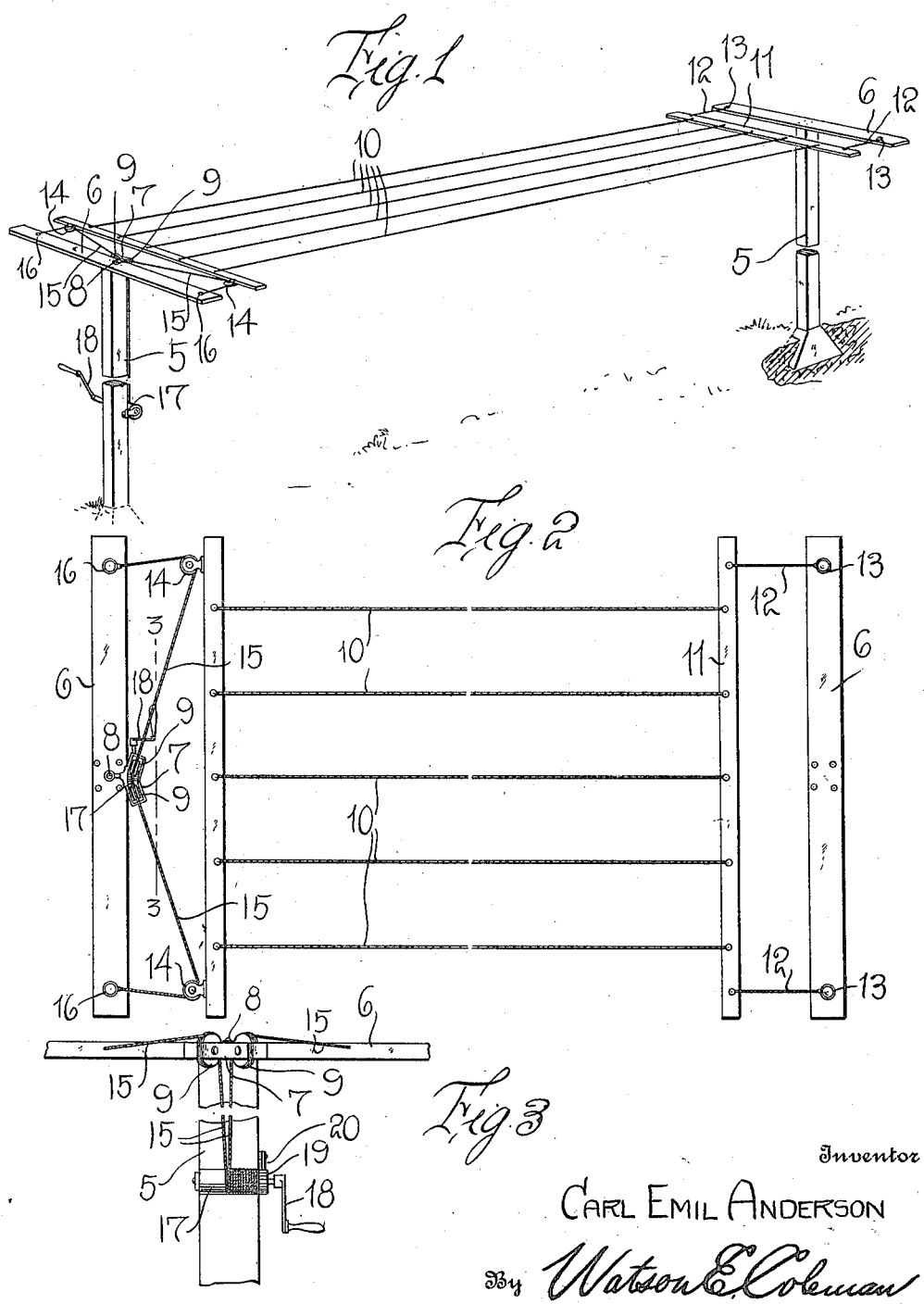

CARL EMIL ANDERSON, OF SIOUX CITY, IOWA.

CLOTHES-LINE.

1,220,713.  Specification of Letters Patent.  Patented Mar. 27, 1917.

Application filed October 14, 1916.  Serial No. 125,666.

*To all whom it may concern:*

Be it known that I, CARL EMIL ANDERSON, a subject of the King of Sweden, residing at Sioux City, in the county of Woodbury and State of Iowa, have invented certain new and useful Improvements in Clothes-Lines, of which the following is a specification, reference being had to the accompanying drawings.

This invention relates to an improved clothes line and has for its primary object to provide very simple and easily operated means for supporting and tightening one or more clothes lines.

It is another object of my invention to provide a device for the above purpose which will enable the user to readily lower the clothes line to a convenient position whereby the articles may be easily attached, and then raise or elevate the line and the articles carried thereby and tighten the line so as to prevent sagging of the same and possible engagement of the articles with the ground.

It is a further general object of my invention to improve and simplify the construction of clothes line supports, whereby the same are rendered serviceable in practical use and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a perspective view illustrating the preferred embodiment of my invention;

Fig. 2 is an enlarged top plan view of one of the clothes line supports; and

Fig. 3 is a section taken on the line 3—3 of Fig. 2.

Referring in detail to the drawing, 5 designates two properly spaced poles or supports, the lower ends of which may be suitably anchored in the ground. Upon the upper end of each of these supports, a transversely disposed, horizontal bar 6 is securely fixed, and to one of the bars 6, centrally thereof, a yoke 7 is pivotally connected, as at 8. In the yoke 7, the angularly disposed sheaves or pulleys 9 are suitably mounted.

The clothes lines indicated at 10 are fixed at their extremities to the end bars 11. Any desired number of these lines may be employed and one of the bars 11 is connected by means of a plurality of wires or other flexible elements 12 to rings 13 engaged in one of the bars 6. A pulley or sheave 14 is attached to each end of the other bar 11, and around the same the wires or cables 15 extend, said wires having one of their ends attached to rings 16 engaged in the ends of the other bars 6. From the pulleys 14, the wires 15 extend inwardly and over the respective pulleys 9. The two wires then extend downwardly along side of the pole 5 and are suitably connected to a drum 17 mounted upon one side of said pole. One end of the drum shaft is provided with a suitable crank 18, by means of which the drum may be conveniently rotated, and upon said shaft a ratchet 19 is secured for engagement by a pawl 20 pivotally mounted upon the pole 5.

In the use of the device, it will be understood that when the pawl or dog is disengaged from the ratchet and the drum turned to unwind the wires or cables 15 therefrom, the clothes lines 10 will be lowered so that the garments or other articles may be easily pinned or otherwise attached thereto. After attaching the articles the operator rotates the drum 17 so as to wind the wires or cables 15 thereon, drawing the same over the pulleys 9 and thus elevating and tightening the clothes lines 10 between the bars 6. In this manner, the lines will be at all times properly sustained in their elevated positions so that they cannot sag, whereby possibility of the clothes contacting with the ground and becoming soiled is obviated.

From the foregoing description, taken in connection with the accompanying drawing, the construction, manner of use and several advantages of the device will be clearly and fully understood. While the invention is exceedingly simple, it is also very convenient and serviceable in practical use and provides means whereby a large number of articles may be properly suspended. In view of the simplicity of the invention, it is manifest that the same may be produced at relatively small manufacturing cost.

While I have shown and described the preferred construction and arrangement of the several parts, it is to be understood that the device is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:—

A clothes line including a plurality of spaced lines and end bars connecting the same, spaced standards, a horizontal bar fixed upon the upper end of each standard and of approximately the same length as said end bars, flexible elements connecting one of the end bars at its extremities to one of said horizontal bars, a drum rotatably mounted upon one of said standards, sheaves on the other end bar adjacent its ends, cables passing around said sheaves and having one of their extremities fixed to the horizontal bar on the latter standard, a pair of sheaves swingingly mounted upon the latter horizontal bar over which the respective cables are engaged, said cables having their other ends attached to said drum, whereby the clothes lines are elevated and tightened when the drum is rotated in one direction, and means for holding the drum against reverse rotation.

In testimony whereof I hereunto affix my signature in the presence of two witnesses.

CARL EMIL ANDERSON.

Witnesses:
C. A. NORRBORN,
EMIL A. JOHNSON.

Copies of this patent may be obtained for five cents each, by addressing the "Commissioner of Patents, Washington, D. C."